United States Patent
Müller

[15] 3,661,380
[45] May 9, 1972

[54] APPARATUS FOR LOADING SHEETS ON A CONVEYOR

[72] Inventor: Hans Müller, Zofingen, Switzerland
[73] Assignee: Grapha Maschinenfabrik Han Muller AG, Zofingen, Switzerland
[22] Filed: Mar. 6, 1970
[21] Appl. No.: 17,123

[30] Foreign Application Priority Data
Mar. 7, 1969 Switzerland ..........................3500/69

[52] U.S. Cl. ................................................271/14, 270/54
[51] Int. Cl. ...........................................................B65h 5/04
[58] Field of Search ......................270/53, 54, 55; 271/14, 54

[56] References Cited
UNITED STATES PATENTS 2,880,995 4/1959 Rimes ....................................271/14
2,654,374 7/1953 Pickering ............................271/54 X

*Primary Examiner*—Joseph Wegbreit
*Attorney*—Michael S. Striker

[57] ABSTRACT

Folded sheets are partly unfolded and deposited in a straddling position on a holder bar which is reciprocated along a conveyor so that the sheet is accelerated and moves at a minimum speed relative to the conveyor when in the direction of movement of the conveyor when stripped from the holder bar. During movement of the holder bar and sheet in a forward stroke in the direction of movement of the conveyor, the leading end of the holder bar is moved toward the conveyor to facilitate the transfer.

11 Claims, 3 Drawing Figures

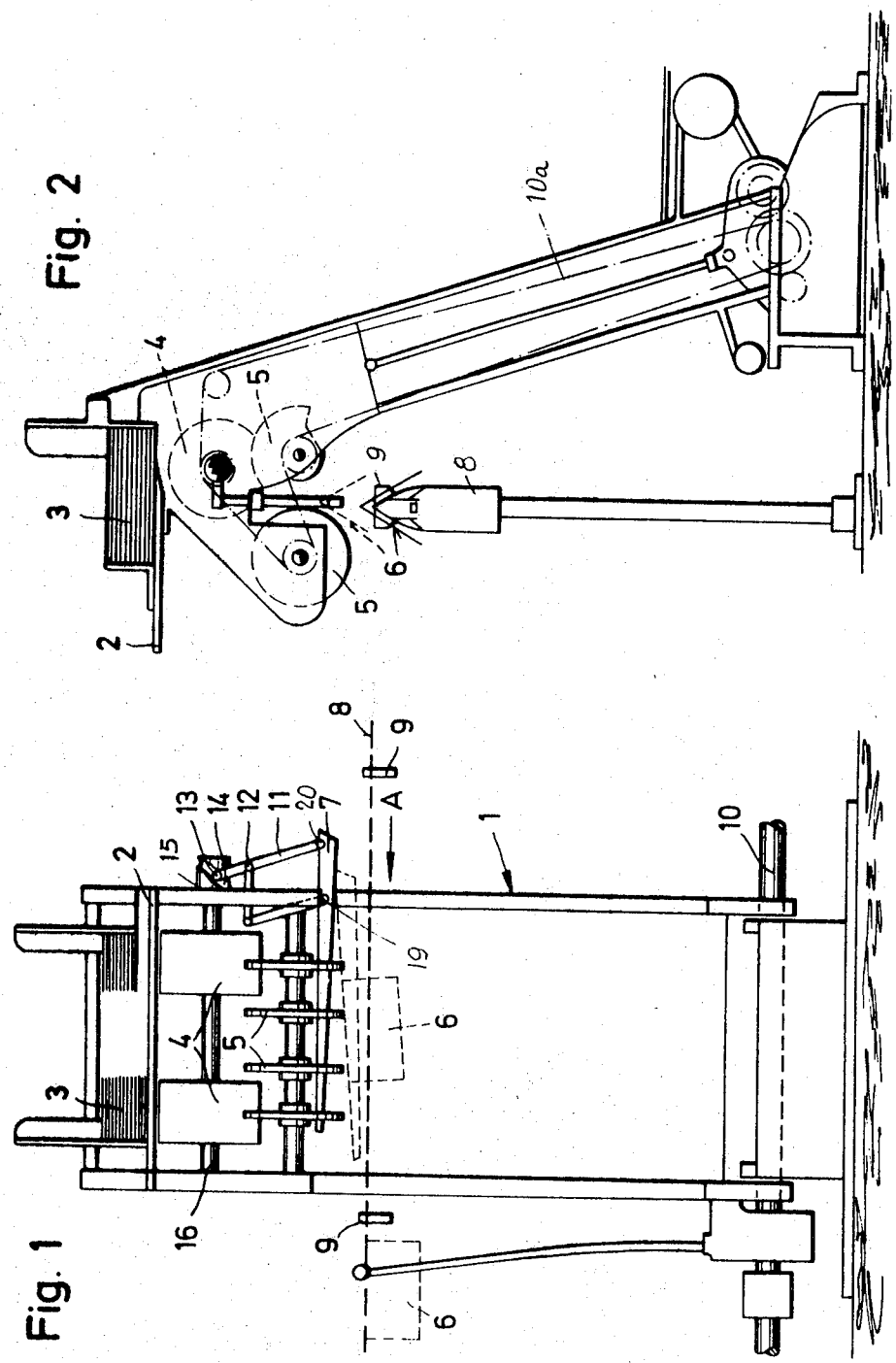

3,661,380

APPARATUS FOR LOADING SHEETS ON A CONVEYOR

BACKGROUND OF THE INVENTION

The present invention is related to apparatus of the type disclosed in my U.S. Pat. Nos. 3,199,862, 3,245,679, and 3,414,257.

SUMMARY OF THE INVENTION

It is one object of the invention to improve the loading apparatus for loading sheets on a conveyor, and to provide a loading apparatus which reliably operates with partly unfolded sheets.

Another object of the invention is to provide loading means which not only move in the direction of the conveyor which is being loaded, but also moves toward the same when a sheet is to be transferred to the conveyor.

With these objects in view, an embodiment of the present invention comprises loading means, preferably including a holder for a sheet and movable support means for the holder which is movable between a rear position and a forward position; drive means for moving the conveyor in one direction and for reciprocating the loading means; feeding means for feeding a sheet to the loading means substantially in the rear position so that the sheet is accelerated during movement to the forward position; and engaging means spaced along the conveyor for engaging the sheet on the loading means at the moment of the highest speed of the same in the direction of movement of the conveyor. The supporting means of the sheet holder which is preferably a loading bar straddled by a partly folded sheet, not only moves the holder between the rear position and forward position but also moves at least the end of the holder leading in the direction of movement of the conveyor toward the same during movement to the forward position. The drive means include a rotary shaft and cam means for operating the movable supporting means.

The novel features which are considered as characteristic for the invention are set forth in particular in the appended claims. The invention itself, however, both as to its construction and method of operation, together with additional objects and advantages thereof will be best understood from the following description of specific embodiments when read in connection with the accompanying drawings.

BRIEF DESCRIPTION OF THE DRAWING

FIG. 1 is a fragmentary front view of an embodiment of the invention;

FIG. 2 is a side elevation taken in the direction of the arrow A; and

DESCRIPTION OF THE PREFERRED EMBODIMENT

Figure 3:
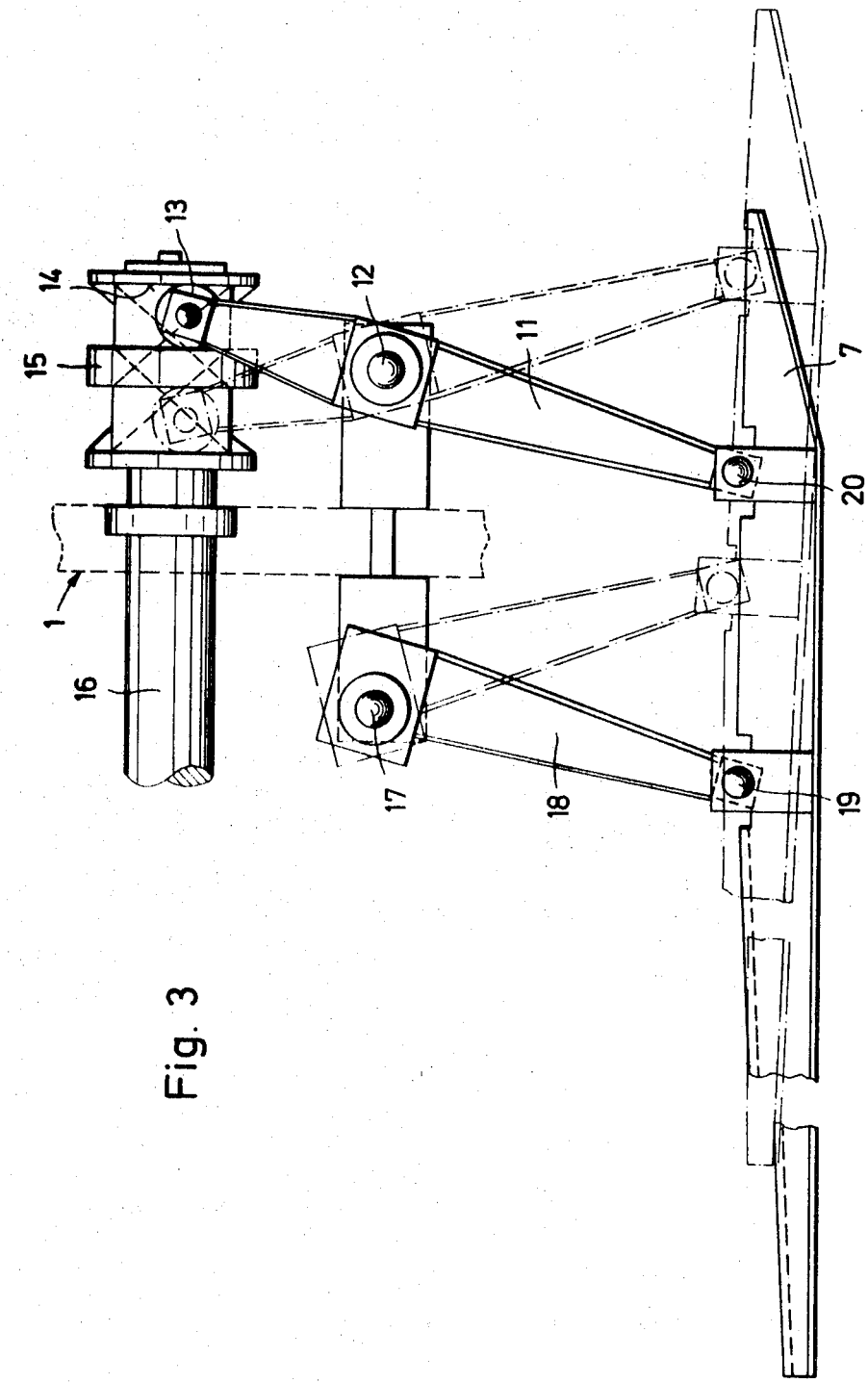
FIG. 3 is a fragmentary front view illustrating a detail of the apparatus on a larger scale.

As best seen in FIGS. 1 and 2, the apparatus includes a frame 1 having a platform or magazine 2 in which a stack of folded sheets 3 is located. As described in my U.S. Pat. No. 3,199,862, a gripper drum 4 removes the lowermost folded sheet of stack 3 whereupon spreading drums 5 partly unfold the sheet and drop the same in the position 6 onto a holding bar 7. A conveyor 8 with engaging members 9 moves in the direction of the arrow A under the holder bar 7 so that the sheet on holder bar 7 is engaged by the engaging means 9, stripped from the holder bar 7 and placed on conveyor 8. A main shaft 10 drives by a belt or chain transmission 10a shaft 16 of the gripper drum 4, the shafts of the spreading drums 5, and conveyor 8, 9 in synchronism.

As best seen in FIGS. 1 and 3, the holder bar 7 is connected by a pivot 20 to a double-armed lever 11 which is mounted on a stationary support fixed to a wall of frame 1 by means of a pivot shaft 12. The free arm of lever 11 carries a cam follower roller 13 which is located in a helical endless groove 14 of a cam drum 15, secured to shaft 16 on which the spreading drums 4 are mounted. The helical groove 14 is constructed so that during one revolution of shaft 16, the holder bar 7 is reciprocated between a forward position shown in solid lines in FIG. 3, and a rear position shown in chain lines in FIG. 3.

A second lever 18 is connected by a pivot means 19 to the portion of holder bar 7 which leads in the direction of movement of conveyor 8, while pivot shaft 20 is connected to the trailing portion of holder bar 7. Lever 18 is connected by a pivot 17 to another stationary support mounted on a wall of frame 1 symmetrical to the support of lever 11.

The pivot axes of pivot means 12 and 17, and of pivot means 19 and 20 are parallel and perpendicular to a plane in which levers 11 and 18, and holder bar 7 are located.

The effective lever arm of lever 18 between pivot axis 17 and pivot axis 19 is longer than effective lever arm of lever 11 between pivot axis 12 and pivot axis 20. The distance between the pivot axes 12 and 17 is slightly greater than the distance between the pivot axes 19 and 20. The distance between pivot axes 19 and 20 remains the same in the forward position shown in solid lines, and the rear position shown in chain lines.

During operation of the apparatus, rotary cam 15 angularly reciprocates lever 11, and due to the provision of lever 18, the holder bar 7 is reciprocated between the rear and front positions shown in FIG. 3. Due to the greater length of the effective lever arm of lever 18, the end of holder bar 7 leading in the direction of movement of the conveyor 8 moves downward toward the conveyor 8 so that a partly unfolded angular sheet 6 straddling the holder bar 7 easily slides onto conveyor 8 when engaged by an engaging means 9 moving with conveyor 8 at a slightly higher speed than the forward speed of holder bar 7 in the direction A.

The rotary movements of spreading drums 5, and gripper drum 4 are synchronized with the reciprocation of the loading means 11, 18, 7 in such a manner that the partly unfolded sheets in the position 6 drop onto the holder bar 7 when the same is in the rear position shown in broken lines in FIG. 3 so that during the following forward stroke in the direction of the arrow A, a sheet 6 is accelerated. When holder bar 7 and sheet 6 move forwardly at the maximum speed, the respective engaging means 9 becomes effective to strip the sheet 6 from the holder bar 7 which then starts its return stroke in the direction opposite to the direction of arrow A and to the direction of movement of conveyor 8, 9.

It will be understood that each of the elements described above, or two or more together, may also find a useful application in other types of loading apparatus for a conveyor differing from the types described above.

While the invention has been illustrated and described as embodied in loading means including a holder bar for accelerating a sheet in the direction of movement of a conveyor, and for moving the sheet toward the conveyor when moving at maximum speed, it is not intended to be limited to the details shown since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. Apparatus for loading sheets on a conveyor, comprising, in combination, a conveyer movable in one direction; loading means including a holder, and supporting means supporting said holder for reciprocating movement along said conveyer between a rear position and a forward position; drive means for moving said conveyer in said one direction at a predetermined high speed, and for reciprocating said holder so that said holder moves almost at said predetermined speed in said one direction when approaching said forward position; feeding means driven from said drive means to deposit a sheet on said holder in said rear position so that the sheet carried by said holder is accelerated by said holder during movement to said forward position; and engaging means secured to said conveyor and moving with the same for engaging the sheet on said holder at the highest speed of said holder and sheet in said one direction so that the moving sheet is stripped from said holder and placed on said conveyer at a minimum relative speed between said sheet and said conveyer.

2. Apparatus for loading sheets on a conveyor comprising, in combination, a conveyor movable in one direction; loading means including a holder bar, and supporting means supporting said holder bar for reciprocating movement along said conveyor between a rear position and a forward position; drive means for moving said conveyor in said one direction at a predetermined high speed, and for reciprocating said holder bar so that said holder bar moves almost at said predetermined speed in said one direction when approaching said forward position; feeding means driven from said drive means and including means for unfolding folded sheets, and means for depositing in a straddling angular position an unfolded sheet on said holder bar in said rear position so that said unfolded sheet straddling said holder bar is accelerated by said holder bar during movement to said forward position; and engaging means secured to said conveyer and moving along a path in which said straddling unfolded sheet is located so that said unfolded sheet is stripped from said holder bar and placed on said conveyer at the minimum relative speed between said sheet and said conveyor.

3. Apparatus as claimed in claim 1 wherein said supporting means are movable and driven by said drive means to move at least the end of said holder leading in said one direction toward said conveyor during movement to said forward position, and away from said holder to a sheet receiving position during movement to said rear position.

4. Apparatus as claimed in claim 3 wherein said drive means include a rotary shaft, cam means on said shaft, and cam follower means cooperating with said cam means and connected with said movable supporting means for operating said loading means.

5. Apparatus as defined in claim 4 wherein said cam means includes a cam drum having a cylindrical surface formed with a helical cam groove in which said cam follower means is guided; and wherein said movable support means include drive lever means mounted for angular movement about a stationary axis and having an end portion connected with said cam follower means and an other end portion pivotally connected with said holder.

6. Apparatus as claimed in claim 5 wherein said movable supporting means include other lever means mounted at one end portion for angular movement about a stationary axis, and having an other end portion pivotally connected with said holder; and wherein said other end portions are spaced from said axes of the respective lever means different distances, the lever means connected with said leading portion of said holder having the greater distance of said distances for moving the leading end of said holder toward said conveyor.

7. Apparatus as claimed in claim 3 comprising a stationary support; wherein said movable supporting means include first and second levers mounted on said stationary support for angular movement about two parallel axes; wherein said holder is an elongated bar pivotally connected with said first and second levers for movement about pivot axes parallel with said axes, and is located in the plane of said levers; and wherein said drive means include a rotary cam and a cam follower connected with one of said levers for reciprocating said holder.

8. Apparatus as claimed in claim 7 wherein said first lever is connected with the leading end of said bar and said second lever is connected to the trailing end of said bar, and wherein said first lever has a longer effective lever arm than said second lever so that said leading end is moved toward said conveyor in said forward position of said loading means.

9. Apparatus as claimed in claim 8 wherein said second lever has a free lever arm connected with said cam follower.

10. Apparatus as claimed in claim 9 wherein said rotary cam rotates about an axis perpendicular to said axes.

11. Apparatus as claimed in claim 3 wherein said feeding means include means for unfolding folded sheets; and wherein said holder is an elongated bar straddled by a fed unfolded sheet in a position projecting into the path of movement of said engaging means.

* * * * *